United States Patent

Chen et al.

[11] 3,911,067
[45] Oct. 7, 1975

[54] DIRECT CONTACT GAS CONDENSER

[75] Inventors: Tze-ning Chen, Princeton; John M. Burns, Hackettstown, both of N.J.; James M. Brandle, Easton, Pa.

[73] Assignee: Ingersoll-Rand Company, Woodcliff Lake, N.J.

[22] Filed: Oct. 9, 1973

[21] Appl. No.: 404,278

[52] U.S. Cl. ......... 261/113; 261/118; 261/DIG. 10
[51] Int. Cl.² ............................................. B01F 3/04
[58] Field of Search .................. 165/111–114, 165/116, 117; 261/DIG. 10, DIG. 32, 115, 118, 113

[56] References Cited
UNITED STATES PATENTS

| | | | |
|---|---|---|---|
| 1,606,032 | 11/1926 | Kolstrand | 261/118 X |
| 1,624,557 | 4/1927 | Moffat | 261/118 |
| 1,721,261 | 7/1929 | Smith | 165/114 |
| 1,776,020 | 9/1930 | Elliott | 165/114 |
| 2,050,158 | 8/1936 | Cacioppo | 165/117 X |
| 2,093,895 | 9/1937 | Mojonnier et al. | 261/DIG. 10 |
| 2,558,222 | 6/1951 | Parkinson | 165/114 X |
| 2,956,784 | 10/1960 | Parkinson | 165/112 |
| 3,349,841 | 10/1967 | Stoker | 165/114 X |
| 3,575,392 | 4/1971 | Stoker et al. | 165/114 X |
| 3,747,673 | 7/1973 | Jones et al. | 165/112 X |

FOREIGN PATENTS OR APPLICATIONS

| | | | |
|---|---|---|---|
| 715,162 | 9/1954 | United Kingdom | 165/114 |

*Primary Examiner*—Tim R. Miles
*Assistant Examiner*—Richard L. Chiesa
*Attorney, Agent, or Firm*—F. S. Troidl

[57] ABSTRACT

A plurality of vertically spaced, perforated trays are arranged in the liquid path from the liquid inlet to the liquid outlet. The liquid droplets pass through the trays at a predetermined rate of flow.

Steam or any other suitable gas is fed into the condenser housing and flows in a crosswise pattern through the water droplets. The non-condensable gases are pumped from the housing.

6 Claims, 6 Drawing Figures

U.S. Patent   Oct. 7,1975   Sheet 1 of 3   3,911,067

DIRECT CONTACT GAS CONDENSER

This invention relates to direct contact gas condensers. More particularly this invention is a direct contact gas condenser including a novel arrangement of perforated trays in a housing causing the gases to be condensed by crossflow through the falling liquid and directly to the non-condensable gas outlet.

Though this invention may be used to condense any suitable gas by any suitable liquid it is particularly useful to condense steam with water. In currently used direct contact gas condensers, the water trays are arranged to provide a long, tortuous path for the steam flow from the steam inlet to the non-condensable steam outlet. In order to provide this long, tortuous steam path a highly complicated, bulky system with a large housing is required.

To overcome these disadvantages we have invented a new and improved direct contact gas condenser which is simpler, smaller, and easier to maintain than other similar direct contact gas-condensers. In addition to being simpler and more compact, our gas condenser provides a steam path through the water showers which is shortened by as much as 66 percent when compared with other currently used similar direct contact steam condensers. This diminishes the associated pressure losses and results in a higher ejector suction pressure.

Briefly described, our direct contact gas condenser comprises a housing with at least one circulating liquid inlet and at least one circulating liquid outlet. A tray set is arranged in each liquid path, that is, one tray set if the condenser has one liquid path, two tray sets if the condenser has two liquid paths, etc. The tray set includes a plurality of vertically spaced pairs of trays. The trays in each pair are horizontally separated. Each tray is provided with a plurality of holes which are sized for the liquid to flow at a predetermined rate of flow at a predetermined liquid head over the holes.

The housing is also provided with a gas inlet and at least one gas outlet. The gas outlet is located above the uppermost pair of trays in each tray set. The trays are dimensioned to provide spaces on the outsides of the tray set so gas will flow along the outsides of the tray set, between the vertical spaced pairs of trays and upwardly in the horizontal spaces between the trays of each pair. The non-condensable gases are pumped from the housing.

The invention, as well as its many advantages, will be further understood by reference to the following detailed description and drawings in which.

In the various figures like parts are referred to by like numbers.

Figure 1:
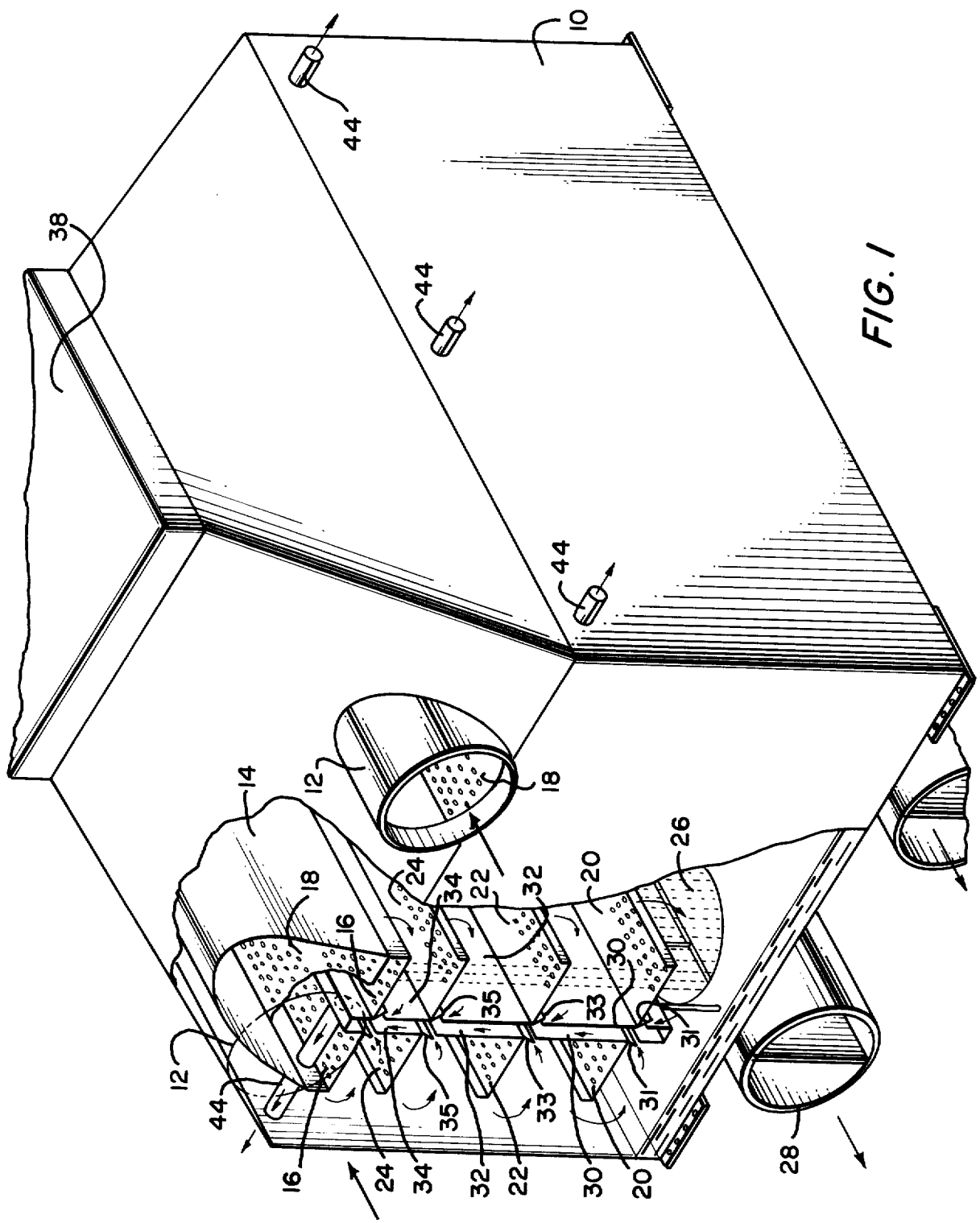
FIG. 1 is a perspective view of our new direct contact gas condenser with a portion of the housing broken away.

Referring to the drawings and more particularly to FIG. 1 our new direct contact gas condenser includes a housing 10 with circulating water inlets 12. In the embodiment shown there are two circulating water inlets. However, it is to be understood that if desired only one circulating water inlet may be utilized with a resulting more compact housing. Of course three or more circulating water inlets may also be used if desired.

The circulating water enters an elongated hooded shaped header 14. The bottom of the header 14 includes a pair of horizontally separated, perforated bottom plates 16. The perforations are sized so that water flowing downwardly from the header 14 will flow at a predetermined rate and liquid level height above the tray.

A perforated plate 18 extends across the inside of the header 14 above the bottom trays 16. An even flow of water throughout the length of the condenser is assured by building it of sufficient size, and by designing an adequate pressure loss into the perforated plate 18. The water is broken up into drops and the flow of water evened out as it passes through perforated plate 18. The pressure loss across plates 16 is less than the pressure loss across plate 18 so that the drops of cold water have a low initial velocity as they enter the heat transfer zone below plates 16.

In the embodiment shown in FIG. 1 a set of trays is provided for each water inlet 12. A complete set of trays is shown at the broken away portion of the housing. It is understood that in the preferred embodiment a complete set of trays is needed for each water inlet. Each set of trays includes a plurality of vertically spaced pairs of perforated trays 20, 22 and 24 located in the water path from the header 14 to the hotwell 26. The holes are sized for the liquid to flow at a predetermined rate at a predetermined head of water in each tray from the hotwell and the header to the outlet pipe 28.

The bottoms of vertical plates 30, 32, and 34 are connected to the inner edges of the trays 20, 22 and 24, respectively. Each vertical plate extends upwardly to a point just below the next higher vertical plate. Angle plates 31, 33, and 35, extend at an angle downwardly and outwardly from the bottom of vertical plates 30, 32 and 34, respectively. The spaces provided between the tops of the vertical plates and the adjacent angle plates are not necessarily the same. In practice the spaces will probably not be the same. These spaces should be of a predetermined size to balance gas pressures and minimize gas short circuiting.

Figure 2:
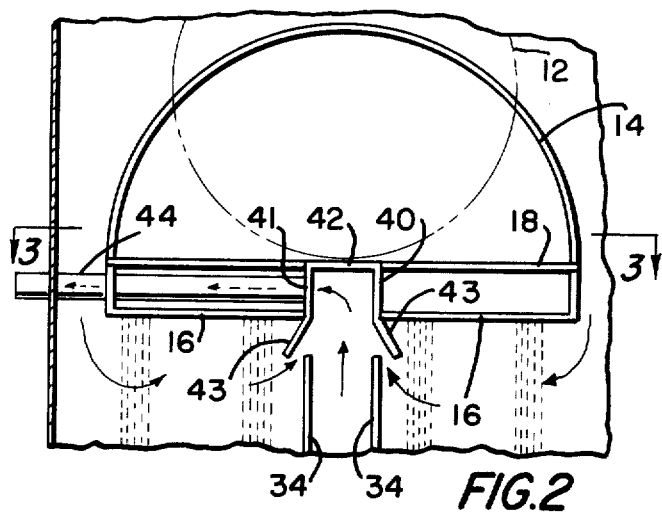
FIG. 2 is a fragmentary view, on an enlarged-scale, showing the water header system of FIG. 1.

As shown more clearly in FIG. 2 elongated, solid, vertical plates 40 and 41 are connected to the inner edges of the bottom plates 16. The vertical plates are spaced apart with a solid top plate 42, interconnecting the vertical plates. Angle plates 43 extend downwardly and outwardly from the bottom of the vertical plates. A plurality of horizontally extending, longitudinally spaced apart, non-condensable gas outlet pipes 44 extend from vertical plate 41 to the outside of the housing 10. Pipes 44 are connected to a pump (not shown) for removing non-condensable gases from the housing.

Figure 3:
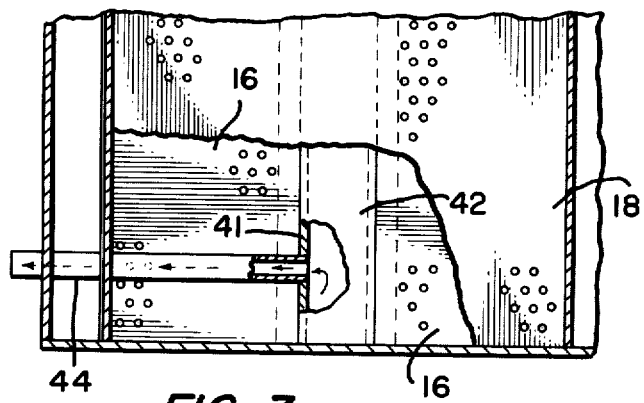
FIG. 3 is a view taken along lines 3—3 of FIG. 2 and in the direction of the arrows.

The trays in each pair of trays 20, 22 and 24 are horizontally separated with the horizontal separations being equal and vertically aligned (See FIG. 1). In the embodiment shown in FIG. 1, FIG. 2, and FIG. 3 the trays 20, 22 and 24 are of the same width and positioned within housing 10 so that steam entering the steam inlet 38 will flow downwardly and then cross flow between the vertically spaced trays 20, 22 and 24, then flow upwardly between vertical plates 30, 32 and 34, then flow into the confined space formed by plates 40, 41, and 42. The non-condensable steam is pumped out of the housing through pipes 44.

The low initial velocity of the water droplets as they leave the perforated plates 16 is important in maximizing the contact time with the steam. Steam entering the gas inlet 38 from, say a turbine exhaust, flows downward around the hood-shaped inlet water headers 14 and turns into the water paths located on either side of each header and each tray set. Because a greater temperature difference causes a greater condensation capability, the largest amount of steam flow will be into the water path directly under the inlet header, which is between plates 16 and trays 24. Subsequent water paths hold substantially less steam flow because the condensation capability is inversely proportional to the water temperature. As a result hotwell water level disturbance occurring from the action of the steam would be minimized. Only a trace of the original steam reaches hotwell 26.

Figure 4:
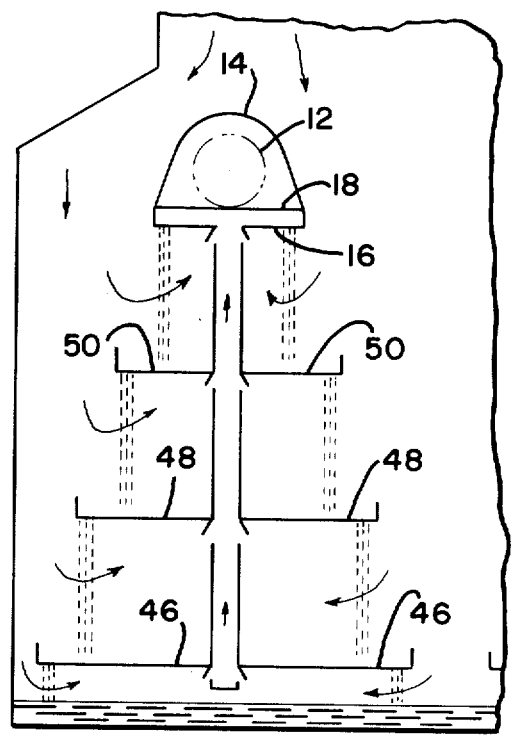
FIG. 4 is a schematic view of a modification of our invention.

In the embodiment shown schematically in FIG. 4 perforated trays 46, 48 and 50 are substituted for trays 20, 22 and 24 in FIG. 1, respectively. The trays shown in the embodiment of FIG. 4 are progressively wider as one progresses from the water inlet 12 to the water outlet.

Figure 5:
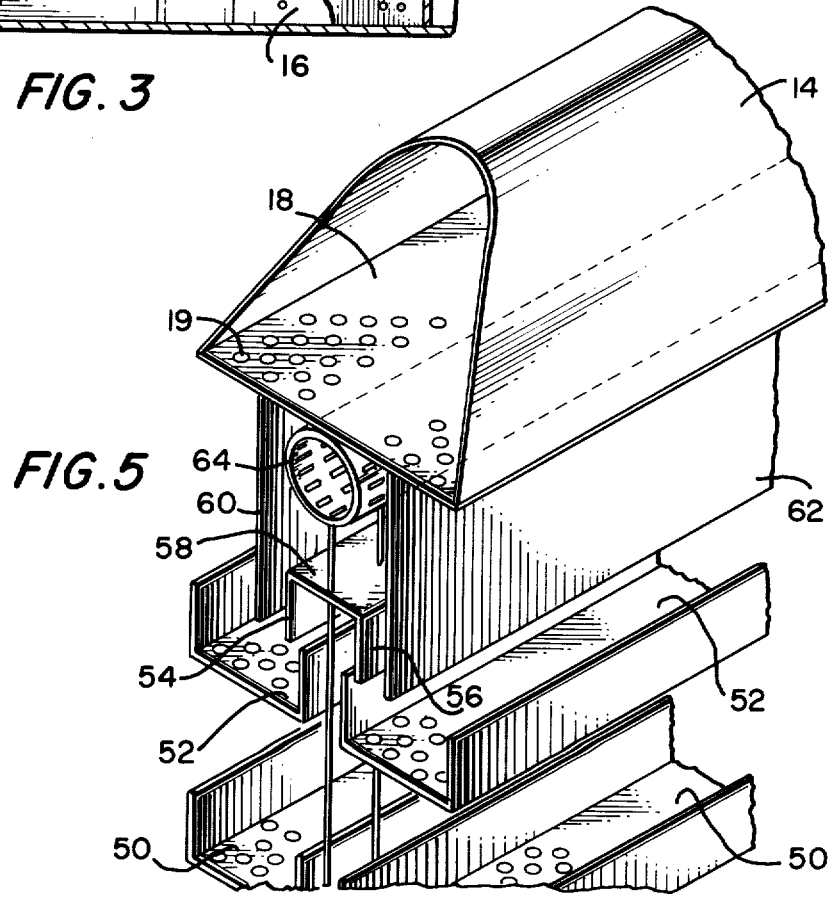
FIG. 5 is a perspective view showing a further modification of our invention.

FIG. 5 is a perspective view of another embodiment of our new direct contact gas condenser. The pairs of vertically spaced trays 50 and 52 are located in a position so that water flowing from the hooded header 14 will flow at a predetermined rate of flow through the perforations in trays 50 and 52 to the water outlet. Two elongated vertical plates 54 and 56 interconnected by a horizontal plate 58 are located in the steam path and above the pair of trays 52. Vertical plates 60 and 62 connected to the bottom of horizontal plate 18 on header 14 extend downwardly from the header 14. Plates 60 and 62 are horizontally outwardly spaced from plates 54 and 56 respectively.

An elongated, longitudinal, slotted pipe 64 is mounted just below plate 18. Before the steam can flow into the slotted pipe it must flow between plates 54 and 60, or between plates 56 and 62, and upwardly toward the slotted pipe. Since water is flowing from the header 14 out of the holes 19 in bottom plate 18 the steam will continue to be condensed until it enters the slotted pipe thereby minimizing the condensable gases which have to be removed from the housing.

Figure 6:
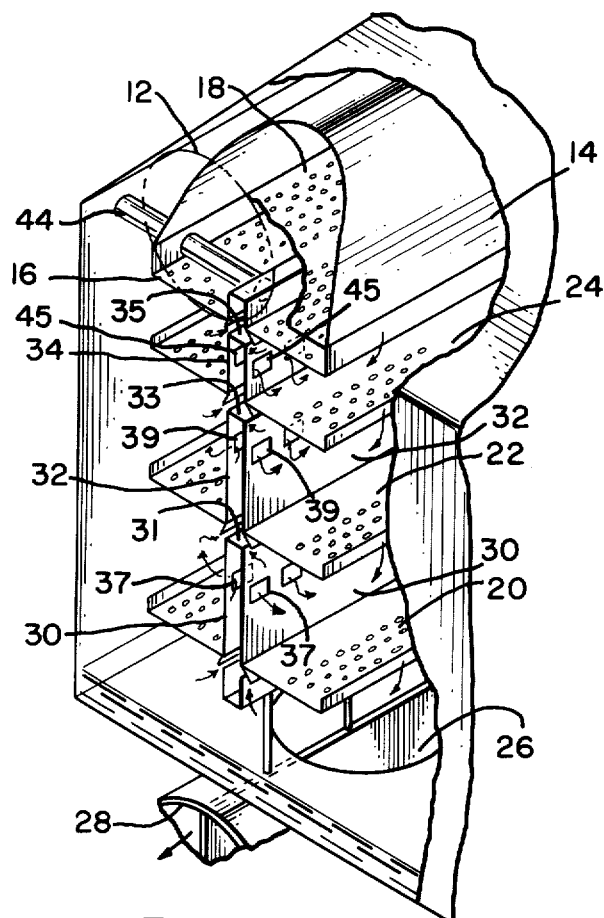
FIG. 6 is a perspective view showing a still further modification of our invention.

The embodiment of FIG. 6 is also constructed to minimize condensable gases which have to be removed from the housing. Horizontal plates 31, 33 and 35 connected across the top of vertical plates 30, 32, and 34, respectively block off the upward steam flow between the vertical plates. Therefore the steam must flow through slots 37, 39, and 45 in vertical plates 30, 32, and 34, respectively. Since water flows downwardly through the horizontal plates and the steam flowing from the slots flows between the plates, more steam will be condensed thereby minimizing the condensable gases which are pumped from the housing.

The preferred embodiments described herein show vertically equally spaced pairs of trays. However, under certain circumstances, a varying vertical spacing may be desirable. Also, though the preferred embodiments show trays of equal width from a centerline, under certain circumstances, it may be desirable to use trays of different widths.

We claim:

1. A direct contact condenser comprising:
a housing having at least one circulating liquid inlet and at least one circulating liquid outlet located below the circulating liquid inlet; a plurality of trays in the housing with all the trays in the housing being spaced from the housing walls and consisting of at least one tray set including a plurality of vertically spaced pairs of trays located in the liquid path from the circulating liquid inlet to a circulating liquid outlet, the horizontal separations between the trays in each pair of trays being equal and vertically aligned, each of the trays being provided with a plurality of holes sized for the liquid to flow at a predetermined rate of flow at a predetermined liquid level from the circulating liquid inlet to the circulating liquid outlet, said pairs of trays being dimensioned to provide space on the outsides of said tray set, said housing having at least one gas inlet at the top of the housing and above the circulating liquid inlet, said circulating liquid inlet being adapted to feed circulating liquid into a water header of less width than the width of the housing and having a bottom comprising a pair of bottom plates horizontally separated by an amount equal to the horizontal separation between the pairs of trays and having holes of a predetermined size; a solid vertical plate connected to the inner edge of each bottom plate, said solid vertical plates being interconnected by a solid top plate, and a gas outlet extends from the side of the outer vertical plate; and a perforated plate extends across the inside of the header above the header bottom plates, whereby gas entering the housing will flow along said space on the outsides of said tray set, and across the liquid path, and upwardly between the trays in each pair toward the gas outlet.

2. A direct contact gas condenser in accordance with claim 1 wherein each of the trays are of the same width.

3. A direct contact gas condenser in accordance with claim 1 wherein the trays in each pair are progressively wider from the water inlet to the water outlet.

4. A direct contact gas condenser in accordance with claim 1 wherein the bottom of a vertical plate is connected to the inner edge of each tray, each vertical plate extending upwardly to a point below the next higher vertical plate, whereby the cross flow of gas between the trays is conducted upwardly through the vertical plates and non-condensable vapor drawn out of the housing from the gas outlet.

5. A direct contact gas condenser in accordance with claim 4 wherein 2 horizontal plate is connected across the horizontally spaced vertical plates, and each vertical plate has a plurality of slots.

6. A direct contact gas condenser in accordance with claim 4 wherein angle plates extend at an angle downwardly and outwardly from the bottom of each vertical plate.

* * * * *